March 23, 1965     E. C. JOHNSON     3,174,646
MECHANISM FOR VENDING ARTICLES FROM INCLINED SUPPORT
Filed Sept. 17, 1962     8 Sheets-Sheet 1

INVENTOR.
Elmer C. Johnson
BY
Hovey, Schmidt, Johnson & Hovey
ATTORNEYS.

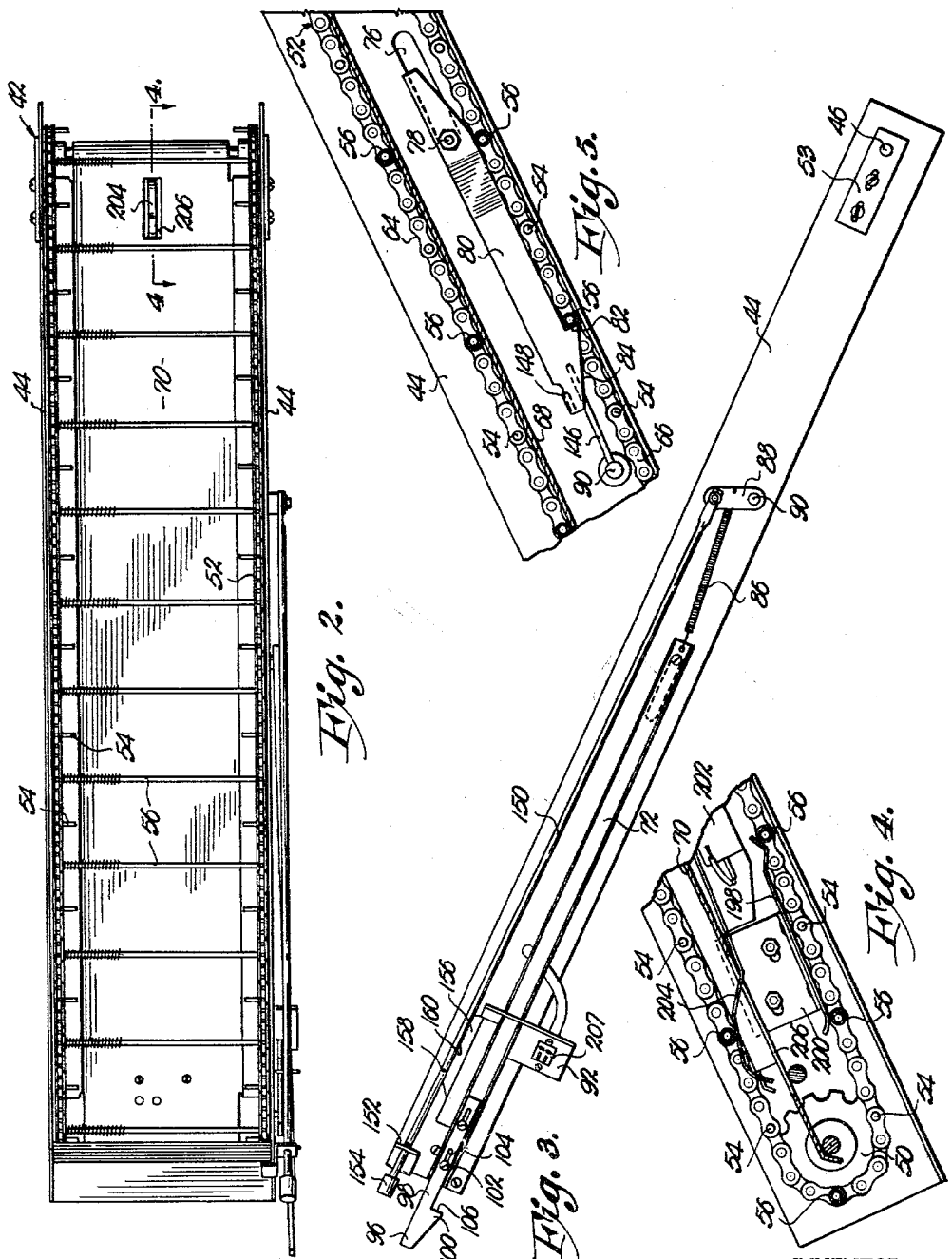

INVENTOR.
Elmer C. Johnson
BY
Hovey, Schmidt, Johnson & Hovey
ATTORNEYS.

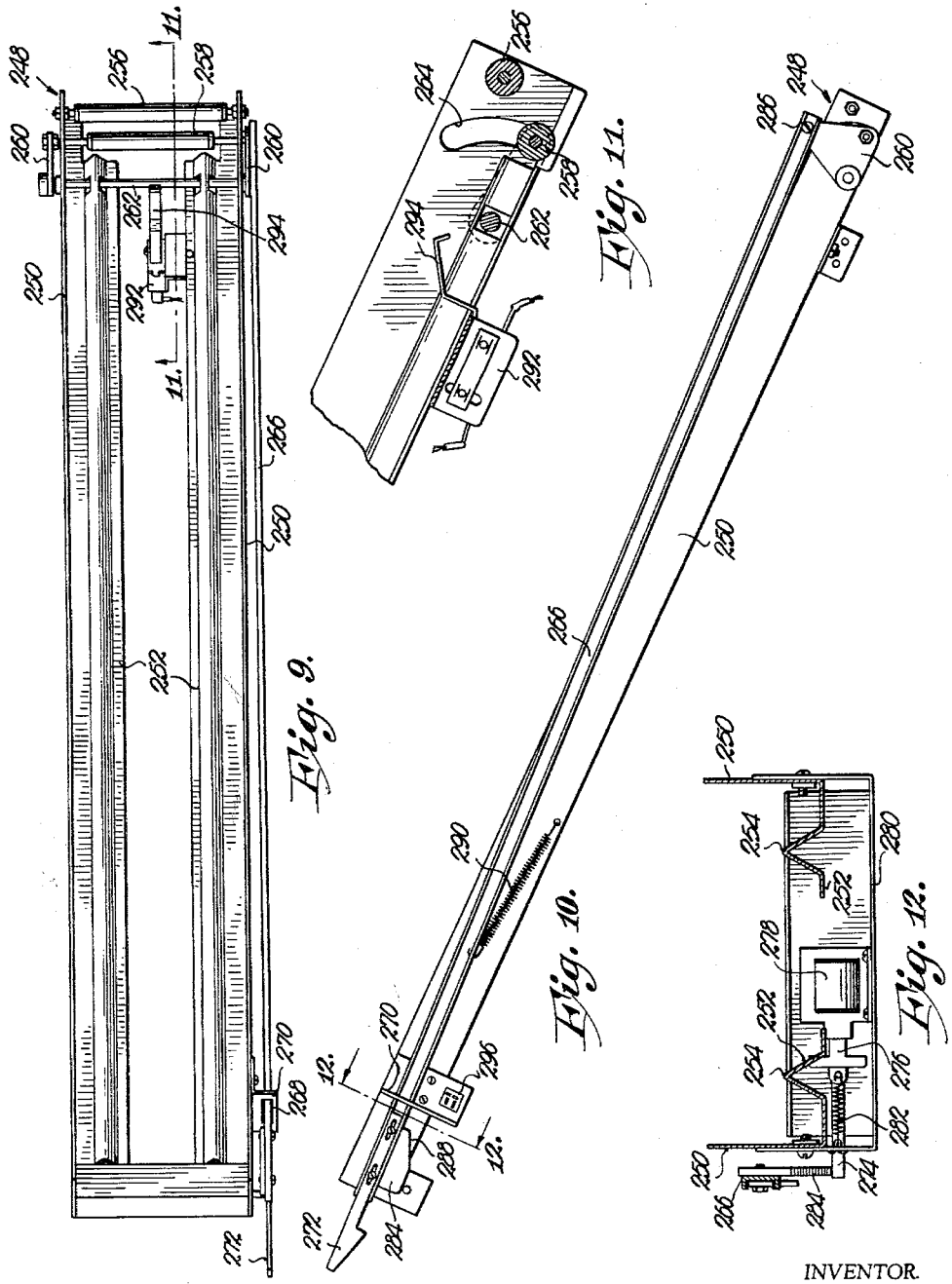

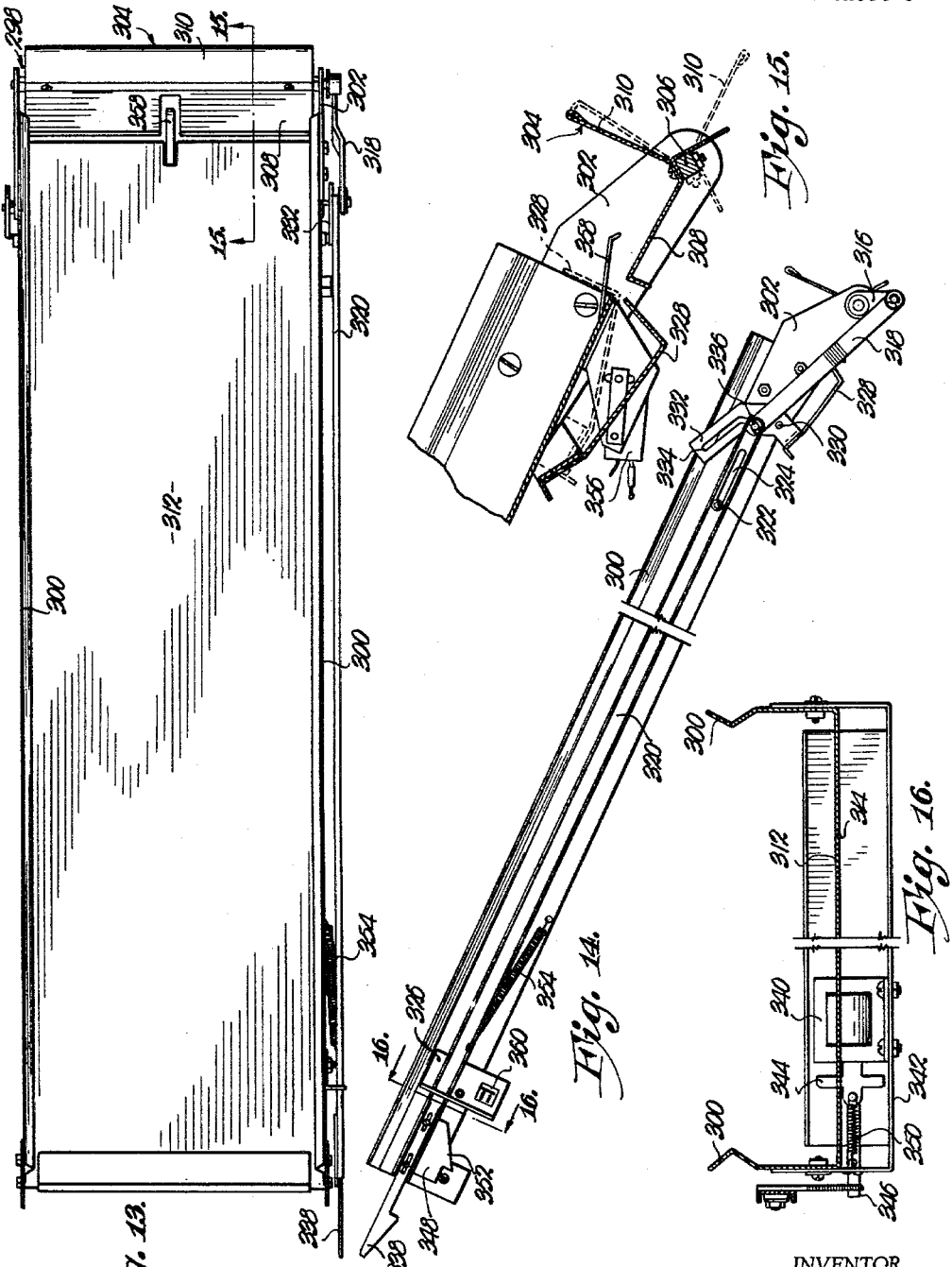

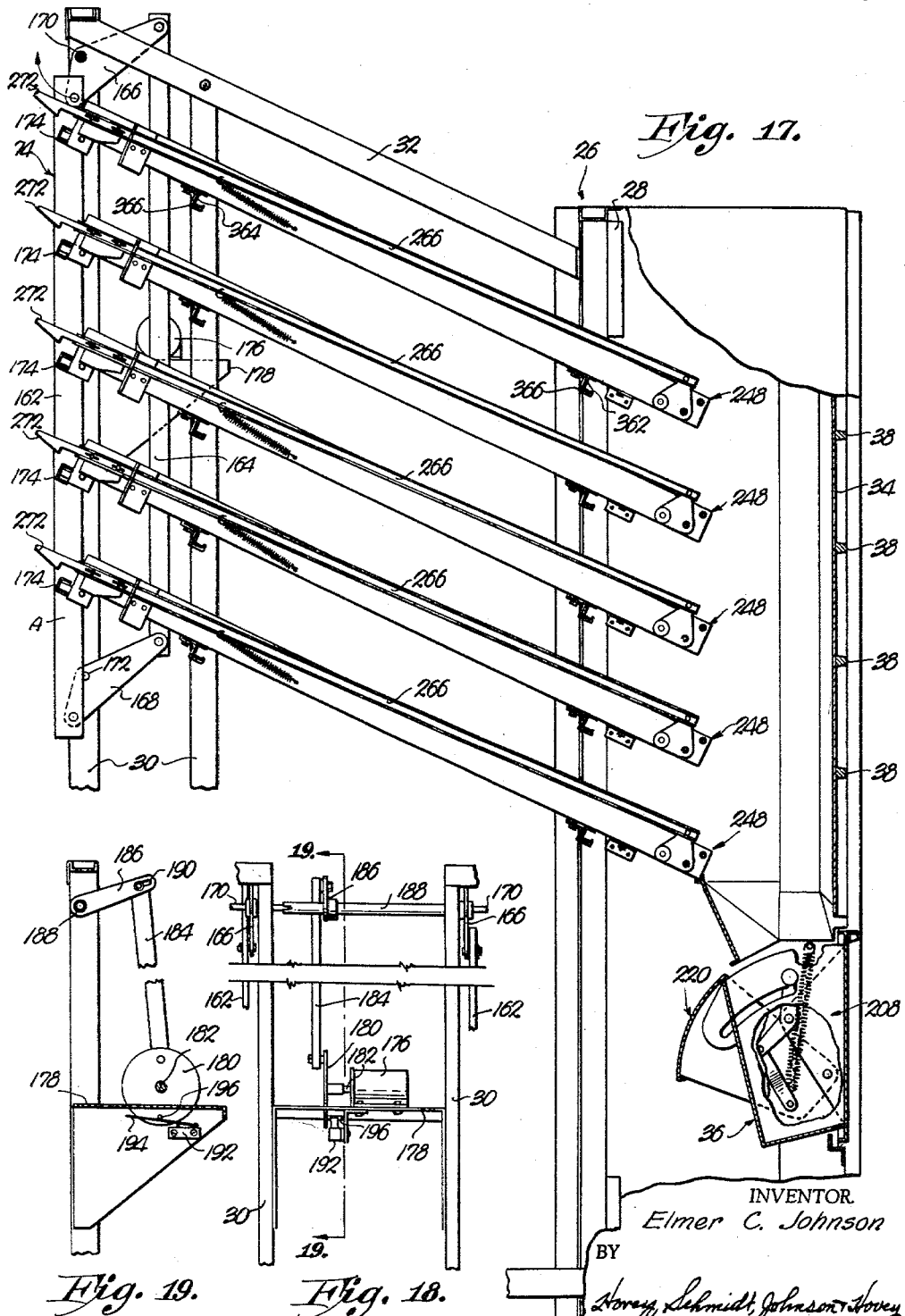

March 23, 1965  E. C. JOHNSON  3,174,646
MECHANISM FOR VENDING ARTICLES FROM INCLINED SUPPORT
Filed Sept. 17, 1962  8 Sheets-Sheet 7

INVENTOR.
Elmer C. Johnson
BY
Hovey, Schmidt, Johnson & Hovey
ATTORNEYS.

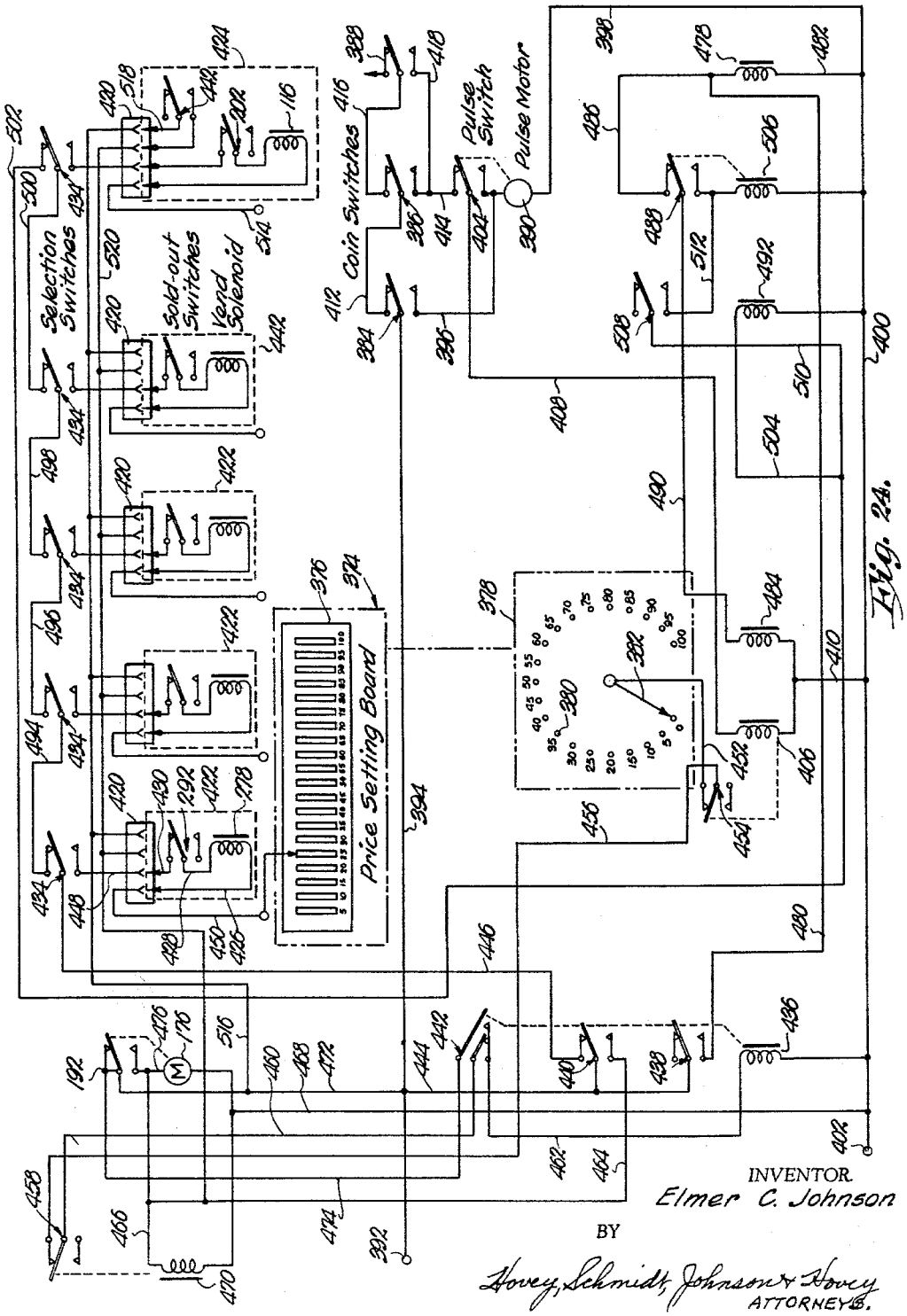

United States Patent Office 3,174,646
Patented Mar. 23, 1965

3,174,646
MECHANISM FOR VENDING ARTICLES FROM
INCLINED SUPPORT
Elmer C. Johnson, Raytown, Mo., assignor to The Vendo
Company, Kansas City, Mo., a corporation of Missouri
Filed Sept. 17, 1962, Ser. No. 223,961
50 Claims. (Cl. 221—129)

This invention relates to coin responsive merchandising apparatus, and more particularly, to automatic, coin-controlled vending machines for dispensing a wide variety of foods and staples upon the deposit of proper coinage in associated coin responsive mechanism.

The present invention provides structure for selectively dispensing merchandise packaged in boxes, bags, sacks, cans, or wrapping paper and, in this respect, the present invention is especially adapted for the vending of foods and staples normally purchased by a consumer in supermarkets and grocery stores, which packaged items are generally provided with printed matter or the like thereon identifying the contents thereof.

In view of the acceptance by the buying public of vending machines capable of dispensing a variety of merchandise, it has become apparent that such vending machines may well be utilized for the dispensing of products normally handled manually and sold in supermarkets, grocery stores and other like commercial establishments. Moreover, retailers are becoming more conscious of profits to be realized in employing automatic, coin-controlled vending machines since a much larger number of saleable items can now be offered to the buying public than was heretofore possible.

Thus even in a sizable operation, the present apparatus tends to eliminate the necessity of employing additional personnel other than an attendant for maintaining an adequate stock of the items in the machines. By virtue of the fact that such machines are compact and take up relatively little space, grocery retailers may use the same for display and dispensing of foods and staples, with little if any sacrifice of space as compared to normal shelf stocking of these items.

The present invention has been directed to the purpose of filling the need for a machine for vending food and staples which are packaged in containers of irregular shapes and sizes, and to this end, the present invention provides a machine for vending a large variety of foods and staples packaged in boxes, bags, sacks, cans or wrapping paper of various shapes and sizes. Furthermore, the present invention provides a machine for displaying the items for the convenience of the consumer prior to the purchase of any one of the items so that the consumer may view the type, brand and price of the item before actuating the machine upon the deposit of proper coinage in the associated coin responsive mechanism.

The present invention is constructed to vend only a single item after the proper deposit of coinage in the machine and access to any other than the item purchased is effectively prevented.

It is, therefore, the primary object of the present invention to provide coin responsive merchandising apparatus for vending a large variety of merchandise packaged in boxes, bags, sacks, cans and wrapping paper wherein the packaged items may be disposed in visually observable positions for the convenience of prospective purchasers whereby the apparatus is especially adapted for the vending of foods and staples normally disposed in the above-mentioned packages and normally obtainable only at supermarkets and grocery stores. Thus, such apparatus may be conveniently placed in regions not served by or distant from such supermarkets and grocery stores to thereby more effectively serve the buying public, as well as enhance the profit margin of grocery retailers.

Another object of the present invention is the provision of apparatus of the type described which is capable of accommodating items of merchandise packed in the aforementioned packages, and of irregular shapes and sizes and whereby the apparatus need only minor adjustment to handle different sizes of items of merchandise to be vended thereby.

Yet another object of the present invention is the provision of apparatus of the type described which is provided with coin responsive mechanism thereon having means for varying the prices at which the items of merchandise are to be vended so that different items at different prices may be vended from the same or different article-dispensing positions, and at different times as required for a particular locality in which the apparatus is disposed.

Yet another object of the present invention is the provision of apparatus of the type described wherein is provided a number of different types of article supporting and dispensing structures, each designed to most efficiently handle a particular type of packaged item, and being interchangeable with the other structures whereby the positions of the items within the apparatus, as well as the price of the items, may be changed, depending upon the size and shape of the items and the demand therefor in a particular locality in which the apparatus is disposed.

A further object of the present invention is the provision of apparatus wherein is provided drive structure common to all of the article supporting and dispensing structures, and means for selectively coupling one of the structures with said drive structure whereby only a single structure is actuated at any one time and only for a predetermined time to assure that only a single item of merchandise is vended from the apparatus.

Another object of the present invention is the provision of apparatus for dispensing a large variety of foods and staples wherein the apparatus is actuated from the front thereof by a consumer and stocked from the rear thereof by an attendant whereby the stocking operation does not interfere with the vending operation of the apparatus, and regions adjacent the front of the apparatus are not cluttered with items to be placed in the apparatus for subsequent vending operations.

Still another object of the present invention is the provision of a vending machine for displaying the types, brands and prices of the saleable items therewithin for the convenience of prospective purchasers, and wherein the machine is constructed in a manner to provide ready access to an item after the same has been vended, while at the same time preventing access to the remaining items in the machine until proper coinage has been deposited in the associated coin responsive mechanism therefor.

Yet another object of the present invention is the provision of article supporting and dispensing structure within the machine of the aforesaid character which is adjustable as to the size of items to be supported thereon and dispensed therefrom, and relatively independent of the shape of the same, whereby a large variety of items of various irregular sizes and shapes may be accommodated on such structures without substantial modification to the machine or having to remove the machine to an area to effect such changes thereto.

Other objects of the present invention will become apparent as the following specification progresses, reference being had to the accompanying drawings, wherein:

FIG. 2 is a top plan view of one type of article supporting and dispensing structure adapted to be disposed in the machine illustrated in FIG. 1 and especially adapted for vending sacked or bagged merchandise;

FIGURE 3 is a side elevational view of the structure illustrated in FIG. 2;

FIG. 4 is an enlarged, cross-sectional view taken along line 4—4 of FIG. 2;

FIG. 5 is an enlarged, fragmentary, cross-sectional view of the structure illustrated in FIG. 2 and showing the means thereon for advancing the same to vend an individual item of merchandise carried thereby;

FIG. 9 is a top plan view of another type of structure for supporting and dispensing items of merchandise, especially items packaged in boxes or the like;

FIG. 10 is a side elevational view of the structure illustrated in FIG. 9;

FIG. 11 is an enlarged, cross-sectional view taken along the line 11—11 of FIG. 9 and illustrating structure for permitting a single item of merchandise to be removed from the corresponding structure;

FIG. 12 is an enlarged, cross-sectional view taken along line 12—12 of FIG. 10;

FIG. 13 is a top plan view of still another type of structure for supporting and dispensing items of merchandise especially adapted for the dispensing of bread loaves or the like;

FIG. 14 is a side elevational view of the structure illustrated in FIG. 13.

FIG. 15 is an enlarged, cross-sectional view taken along line 15—15 of FIG. 13 and illustrating the means for removing an item of merchandise from the corresponding structure;

FIG. 16 is an enlarged, cross-sectional view taken along line 16—16 of FIG. 14;

Figure 21:
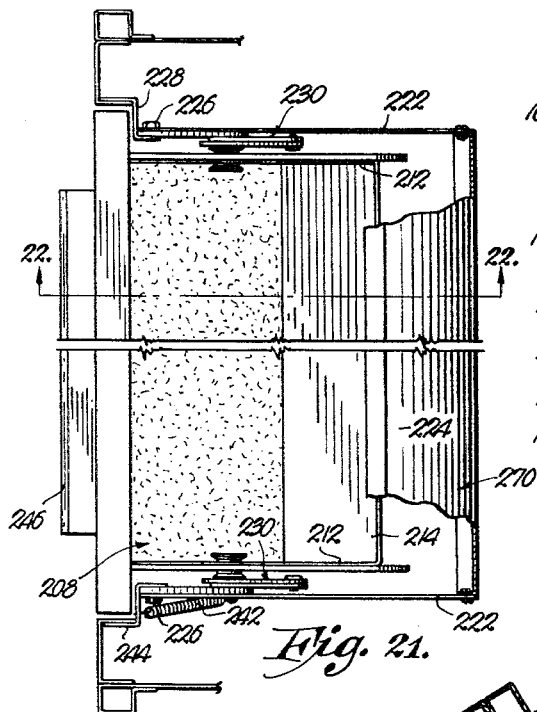
Figure 20:
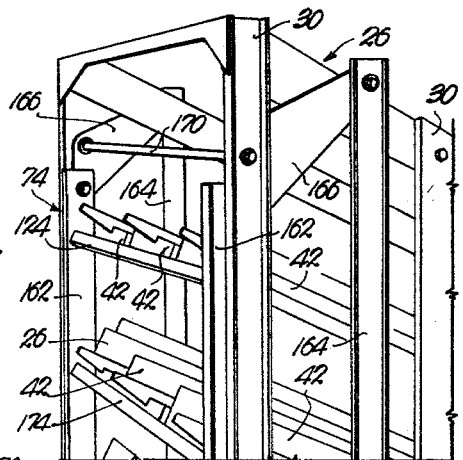
Figure 22:
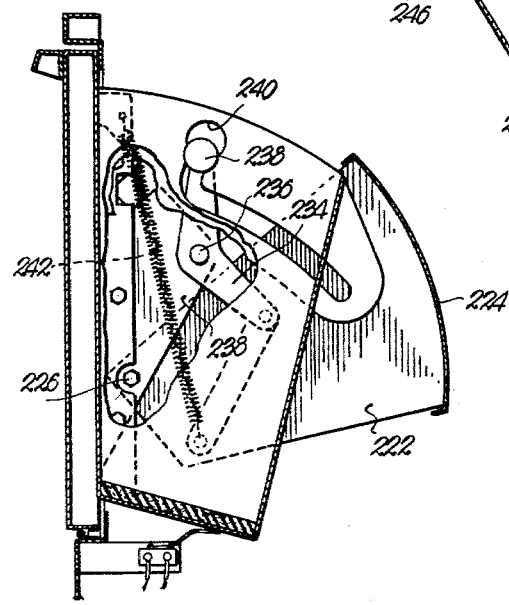
Figure 23:
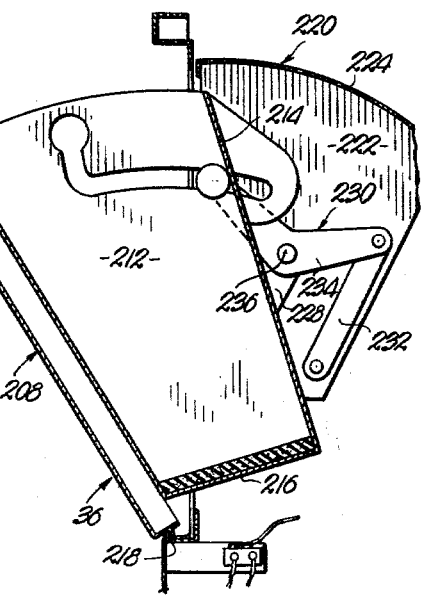

FIG. 17 is a side elevational view of the vending machine forming the subject of the present invention and illustrating a plurality of vertically spaced structures of the type illustrated in FIGS. 9-12 for supporting and dispensing a number of items of merchandise, and further illustrating the means for collecting each item after the same has been removed from the corresponding structure, parts being broken away and in section to illustrate details of construction;

FIG. 18 is a fragmentary, rear elevational view of the drive structure common to the supporting and dispensing structures of the vending machine and illustrating the interconnection of such drive structure with the article and dispensing structures adjacent thereto;

FIG. 19 is a cross-sectional view taken along line 19—19 of FIG. 18;

FIG. 20 is a fragmentary, rear perspective view of the drive structure for one section of the machine and which is adapted to be operably coupled to the prime mover illustrated in FIG. 18 and further showing the structure for interconnecting each individual supporting and dispensing structure with the drive structure for dispensing a single item of merchandise;

FIG. 21 is a top plan view of the collecting means normally disposed below the various types of structures for supporting and dispensing items of merchandise and illustrating means thereon for preventing access to the machine when acceess to the collection means is had by the purchaser;

FIG. 22 is a cross-sectional view taken along line 22—22 of FIG. 21 and illustrating the collection means in a position for receiving an item of merchandise from one of the structures thereabove;

FIG. 23 is a cross-sectional view of the collection means similar to the view of FIG. 22 and illustrating the position thereof rendering the item carried therewithin accessible to the purchaser of the item; and FIG. 24 is a schematic wiring diagram of the coin responsive mechanism forming a part of the present invention and illustrating the interconnection of such mechanism with solenoid-actuated means coupled with each of the aforesaid types of supporting and dispensing structures, and with manually actuated switching means on the front of the machine aligned with a particular structure for actuating the machine after proper coinage has been deposited in the mechanism.

The present invention provides a machine for vending a plurality of items of merchandise packaged in boxes, bags, sacks, cans, or in wrapping paper. The items are visually observable to a prospective purchaser through a transparent front panel preventing access to the items and disposed above collection means in the nature of a swingable drawer. Upon actuation of the machine, an individual item of merchandise is moved off a supporting structure within the machine and caused to gravitate into the collection means wherein the purchaser, upon swinging of the collection means, is able to have access to the item to remove the same from the machine.

Three types of supporting and dispensing structures are utilized in the present invention, one of which is especially adapted for supporting and dispensing sacked or bagged items of merchandise, a second of which is adapted for supporting and dispensing articles in the nature of loaves of bread, and the third of which is especially adapted for the dispensing of items packaged in boxes or the like.

Drive structure is provided in the machine common to all three types of supporting and dispensing structures, and means is provided for selectively placing only one of the structures at any one time in coupled relationship with the drive structure so as to actuate such supporting and dispensing structure to move an item of merchandise therefrom located adjacent one end thereof.

Means is further provided for preventing jackpotting of the machine and for gaining access to any of the items of merchandise carried thereby until proper coinage has been deposited in the associated coin-actuated mechanism.

Figure 1:
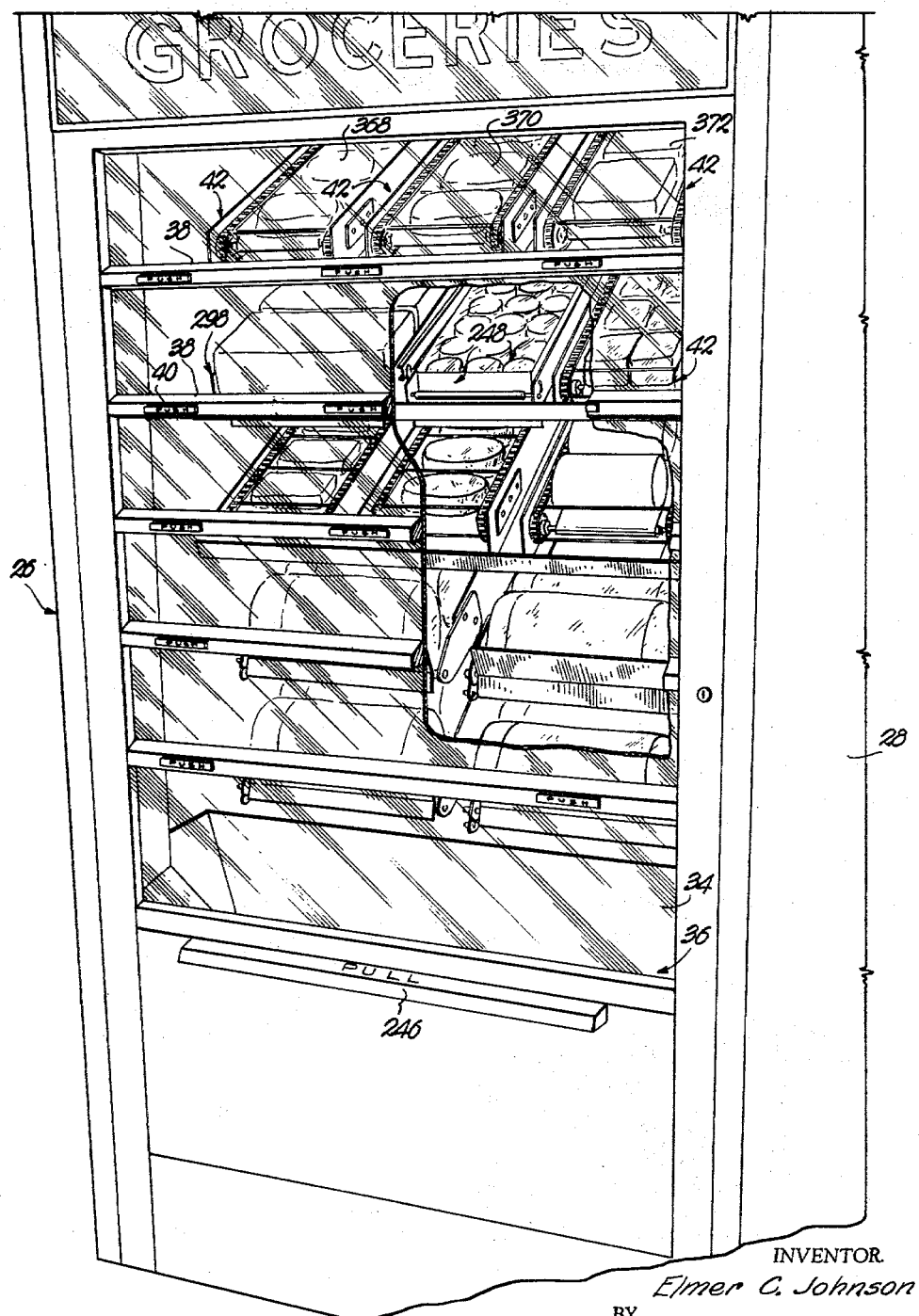
FIGURE 1 is a fragmentary, perspective view of the front of the vending machine which forms the subject of the present invention illustrating a number of various types of foods and staples of irregular sizes and shapes stocked therewithin in positions for subsequent vending therefrom, parts being broken away to illustrate details of construction.

The vending machine which forms the subject of the present invention is broadly denoted by the numeral 26 and is best illustrated in FIGS. 1 and 17. Machine 26 includes a framework comprised of a pair of opposed, upright side panels 28 adjacent the front of machine 26, and a pair of upright beams 30 on each side of machine 26 adjacent the rear end thereof as is clear in FIGS. 17 and 20. An inclined cross-beam 32 interconnects beams 30 on each side of machine 26 with a corresponding panel 28, as is clear in FIG. 17.

A transparent front panel 34 covers the front end of machine 26 and provides means for visually observing items of merchandise carried within machine 26 and adapted to be dispensed therefrom. Panel 34 is disposed above collection means broadly denoted by the numeral 36 for receiving items of merchandise gravitating therewithin so as to render the items accessible to the purchaser after machine 26 has been actuated.

Vertically spaced crosspieces 38 span the width of panel 34 and carry push buttons 40 thereon operably coupled with electrical switching means and aligned with a particular type of item within machine 26. Such switching means associated with each push button 40 is operably coupled with the coin-actuated mechanism of machine 26 so as to actuate machine 26 when a particular bush button 40 is pressed inwardly and after proper coinage has been deposited in the mechanism. A single item aligned with the corresponding push button 40 is then dispensed from supporting means within machine 26 and gravitates into collection means 36 whereupon the purchaser, by manipulating collection means 36, may gain access to the item and remove the same from machine 26.

Means is provided for supporting a number of items or articles of merchandise to be vended from machine 26 and includes first support structure broadly denoted by the numeral 42 and illustrated in FIGS. 2–8. Structure 42 includes a pair of elongated, parallel sides 44 normally extending from a point rearwardly of the front of machine 26 to a point adjacent the rear thereof. Sides 44 are generally inclined in the manner illustrated in FIG. 3 and mount thereon a pair of shafts 46 and 48 at the lowermost and uppermost ends thereof respectively. Each shaft 46 and 48 rotatably carries adjacent the ends thereof, a pair of sprockets 50, and an endless flexible member in the nature of a chain 52 is trained over and operably coupled with each pair of longitudinally aligned sprockets 50 of shafts 46 and 48. Shiftable structure 53 carried by sides 44 and operably coupled with shaft 46 is employed for shifting the latter to apply tension to chains 52 as is required.

Since sprockets 50 are disposed adjacent sides 44, chains 52 are disposed adjacent and extend substantially parallel with sides 44 as is clear in FIG. 2.

Each chain 52 is provided with a number of equally spaced pins 54 thereon extending inwardly from the adjacent side 44, as is clear in FIG. 2. Pins 54 on chains 52 are transversely aligned and are adapted for receiving tubular rods 56, each having a groove 58 therein (FIG. 8) for receiving a pin 54 of one chain 52 after the corresponding pin 54 of the opposite chain 52 has been telescoped in the opposite end of rod 56.

A coil spring 60 is carried by each rod 56 adjacent the slotted end thereof, and the one end 61 of each spring 60 is received within an opening 62 in the corresponding rod 56 (FIG. 6) for retaining end 61 in a fixed position. Spring 60 normally surrounds the groove 58 and, when compressed, permits the corresponding pin to pass through groove 58 and into the tubular end of the corresponding rod 56. Spring 60 is then released to surround both the pin 54 and groove 58 in the manner shown in FIG. 8, and thus moves against the corresponding chain 52.

Each chain 52 is provided with a generally upper stretch 64 and a lower stretch 66, stretches 64 and 66 being inclined and substantially parallel with the longitudinal axes of sides 44. A panel 68 spans the distance between the uppermost and lowermost ends of structure 42 and is provided with a surface 70 normally below stretch 64 as is clear in FIG. 7, and adapted for supporting a number of items or articles of merchandise to be vended by machine 26. Panel 68 is affixed to sides 44 in any suitaable manner.

Articles of merchandise to be supported by structure 42 are generally disposed in the spaces between adjacent rods 56 so that the rod 56 between the article and the lowermost end of structure 42 retains the article on surface 70, while the rod 56 between the article and the uppermost end of structure 42 urges the article toward the lowermost end when chains 52 and thereby rods 56, move toward the lowermost end of structure 42.

It is evident that rods 56 are releasably secured to chains 52 and therefore, structure 42 is capable of accommodating structures of various irregular shapes and sizes. In particular, structure 42 is especially adapted for supporting and dispensing sacked or bagged articles of merchandise, or articles packaged in wrapping paper.

Means for moving chains 52 and thereby rods 56, includes an elongated linkage 72 extending longitudinally of structure 42 adjacent one of sides 44 as is clear in FIG. 3. Linkage 72 interconnects rods 56, and thereby chains 52, with drive structure 74 shown in FIGS. 17 and 20 and hereinafter described.

The side 44 adjacent linkage 72 is provided with a longitudinally extending slot 76 therein for receiving screw means 78 coupling the normally lowermost end of linkage 72 with the upper end of a longitudinally extending link 80 disposed adjacent side 44 and below panel 68, as is clear in FIG. 5. Link 80 is provided with shoulder means 82 along the lowermost longitudinal edge thereof for engaging the front side of a rod 56 for directing the same toward the uppermost end of structure 42 as linkage 72 is moved toward said uppermost end of structure 42, and as screw means 78 traverses slot 76.

Link 80 is provided with an inclined edge 84 for moving link 80 over a corresponding rod 56 when link 80 returns to the position thereof illustrated in FIG. 5, it being clear that link 80 is pivotally mounted on screw means 78. A coil spring 86 secured to the lowermost end of linkage 72, and to an arm 88 swingable upon a pivot pin 90 carried by side 44, normally biases linkage 72 in the position illustrated in FIG. 3 with shoulder means 82 of link 80 between an adjacent rod 56 and the lowermost end of structure 42.

A slotted bracket 92 is carried by the side 44 adjacent linkage 72 and receives the latter in the slot 94 thereof (FIG. 8) to permit linkage 72 to shift longitudinally of structure 42. Bracket 92 thus serves to guide linkage 72 and prevent movement thereof laterally of the corresponding side 44.

A latch member 96 having a slotted shank 98 and shoulder means 100 thereon is adjustably secured to the uppermost end of linkage 72 by screw means 102 passing through the slots 104 of shank 98 and into linkage 72. Shoulder means 100 presents an edge 106 adapted to be placed in latching engagement with drive structure 74 in a manner to be described.

Figure 6:
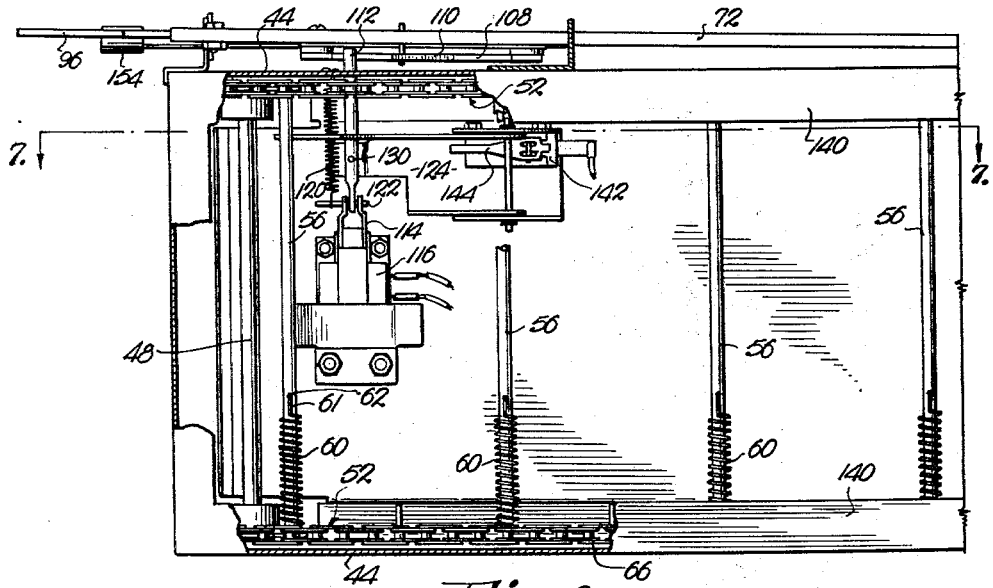
FIG. 6 is an enlarged, fragmentary, bottom plan view of the structure of FIG. 2 and illustrating the means thereon for coupling the same with actuatable drive structure within the machine for actuating the supporting and dispensing structure to thereby effect the vending of an item of merchandise carried thereby, parts being broken away and in section to illustrate details of construction.

Linkage 72 carries an elongated strip 108 thereon on the side thereof adjacent the proximal side 44 as is clear in FIG. 6. Strip 108 is provided with a depression 110 therein intermediate the ends thereof, and is normally in engagement with and above a bar 112 operably coupled to the armature 114 of an electrically actuated solenoid 116 secured to the underside of panel 68, as is clear in FIG. 6. A coil spring 120 normally biases bar 112 in a direction away from solenoid 116, spring 120 being secured at the ends thereof to a pin 122 and to the proximal side 44. As shown in FIG. 6, bar 112 underlies strip 108 to maintain linkage 72 in a predetermined location relative to structure 42. When solenoid 116 is actuated, bar 112 is retracted to clear strip 108, thus permitting linkage 72 to swing downwardly about screw means 78. The lower extremity of slot 94 determines the lowermost extent of downward movement of linkage 72.

A shiftable member 124 is carried below panel 68 by a U-shaped bracket 126 adjacent solenoid 116 as is clear in FIGS. 6 and 7. Member 124 is provided with an L-shaped extension 128 extending upwardly therefrom and in overlying relationship to a pin 130 carried by bar 112 intermediate the ends thereof. Member 124 is also provided with a recess 132 therein directly below and spaced from bar 112, as is clear in FIG. 7.

Figure 7:
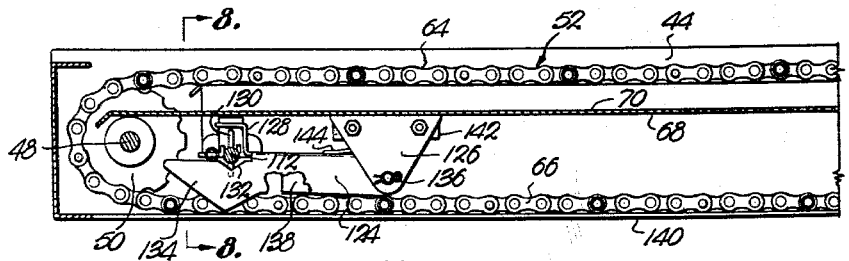
FIG. 7 is a cross-sectional view taken along line 7—7 of FIG. 6.
Figure 8:
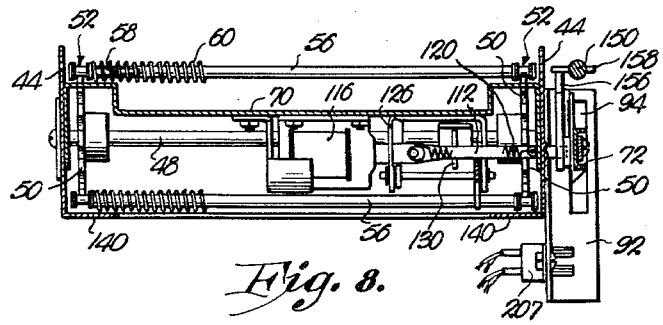
FIG. 8 is a cross-sectional view taken along line 8—8 of FIG. 7.

Member 124 is provided with an inclined edge 134 facing the uppermost end of structure 42 which normally is disposed in the position of FIG. 7. As bar 112 is retracted upon the actuation of solenoid 116, pin 130 moves outwardly from beneath extension 128 to thereby permit member 124 to swing about pin 136 connecting member 124 to bracket 126. Member 124 swings downwardly until a flanged side 138 thereof engages the upper surface of an inwardly directed flange 140 integral with the proximal side 44. Edge 134 is then disposed completely within the path of travel of rod 56, and bar 112 may not move back to its equilibrium position of FIG. 6 under the influence of spring 120 until extension 128 is again moved upwardly to permit pin 130 to pass therebeneath. As the proximal chain 52 moves, a rod 56 moves into engagement with edge 134 to shift member 124 upwardly until extension 128 moves to a position above pin 130.

Thereupon, spring 120 returns bar 112 to the initial position thereof. It is noted that although edge 134 normally extends into the path of travel of rods 56, recess 132 is of a configuration to receive bar 112 and permit slight upward movement of member 124 to clear rods 56 as the same move under the influence of chains 52.

A microswitch 142 is carried by bracket 126 and is provided with a lever 144 coupled with the shiftable pole thereof. Lever 144 normally engages member 124 and, when the latter shifts downwardly, lever 144 moves in the same direction to actuate switch 142.

To facilitate loading of structure 42 with articles to be vended, means is provided for shifting link 80 in a direction such that shoulder means 82 is moved out of the path of travel of rods 56. To this end, an elongated element 146 (FIG. 5) is secured to pin 90 for rotation therewith. Element 146 is disposed to engage the underside of an ear 148 integral with link 80, as is clear in FIG. 5, when pin 90 rotates in a counterclockwise sense when viewing FIG. 5.

Rod 150 is secured at one end thereof to the upper end of arm 88 as is clear in FIG. 3. Rod 150 is received adjacent the uppermost end thereof within an aperture in an L-shaped bracket 152 secured to the proximal side 44 for movement relative thereto. A knob 154 facilitates manual reciprocation of rod 150 longitudinally of structure 42 to thereby rotate arm 88 in a clockwise sense when viewing FIG. 3, and swing element 146. Link 80 is thus pivoted upwardly about screw means 78 to move shoulder means 82 out of the path of travel of rods 56.

To maintain rod 150 in a position with shoulder means 82 out of the path of travel of rods 56, a notched plate 156 is provided on the proximal side 44 for receiving a pin 158 on rod 150 in the notch 160 thereof. The aperture in bracket 152 is of a configuration to permit slight downward movement of rod 150 to thereby permit pin 158 to move into notch 160, the latter being of a configuration to retain pin 158 therewithin until rod 150 is moved upwardly and then longitudinally of structure 42 to the normal position illustrated in FIG. 3.

Structure 42 is normally carried within housing which forms the cabinet of machine 26 with panel 68 in an inclined position and with latch member 96 disposed at the uppermost end of and extending outwardly from structure 42 as is clear in FIG. 3. Chains 52 are disposed so that the lower stretches 66 engage and are supported by flanges 140 of sides 44 to thereby prevent sagging of the chains. As is clear in FIG. 20, a series of three side-by-side structures 42 are employed within machine 26 at one vertical location therewithin. Directly below this location a second series of three side-by-side structures may be disposed, all of which is dependent upon the size of machine 26.

Drive structure 74 (FIG. 20) is disposed at the rear of machine 26 and includes a pair of parallel beams 162 and 164 interconnected by top and bottom coupling members 166 and 168, the latter being illustrated in FIG. 17. Upper coupling members 166 are interconnected by a shaft 170, in turn pivotally mounted on beams 30, as is clear in FIG. 20. Similarly, lower coupling members 168 are interconnected by a shaft 172 parallel with shaft 170 and connected to beams 30 adjacent the lower ends of the latter.

Beams 162 carry vertically spaced crossbars 174 thereon which are normally positioned directly below latches 96 of the side-by-side structures 42 as is clear in FIG. 20. Coupling members 166 are coupled with beams 162 and 164 and pivoted to beams 30 in a manner such that beams 162 are normally in the positions illustrated in FIG. 20.

A prime mover 176 in the nature of an electric motor, is carried on a platform 178 secured to and extending outwardly from a beam 30 as is clear in FIGS. 18 and 19. Motor 176 is provided with a disc 180 secured to the drive shaft 182 thereof and coupled to an arm 184 for reciprocating the latter as disc 180 rotates in a vertical plane. Arm 184 is pivotally secured at the upper end thereof to a crank arm 186 in turn rigid to a shaft 188 coupled in any suitable manner with shaft 170.

As motor 176 is energized, a complete revolution of drive shaft 182 rotates disc 180 through the same arcuate distance to thereby move arm 184 through one complete cycle. Shaft 188 and thereby shaft 170, is thus caused to move through a predetermined arcuate distance in one direction and through the same distance in the opposite direction for each revolution of drive shaft 182. Beams 162 thus move upwardly along arcuate paths to in turn cause crossbars 174 to move in the same direction. As shaft 188 rotates in the opposite direction, beams 162 and thereby bars 174, traverse the same arcuate paths but in the opposite direction.

When the solenoid 116 of one of the structures 42 is actuated, linkage 72 corresponding thereto, is swung downwardly until latch 96 is moved into latching engagement with the corresponding crossbar 174. When this occurs, edge 106 of shoulder means 100 engages the crossbar 174 and is carried therewith as the same traverses the arcuate path thereof. Linkage 72 is thereby shifted substantially longitudinally of structure 42 in a direction away from the lowermost end thereof. Link 80 is thereby shifted toward the uppermost end of structure 42 and shoulder means 82 thereon thus engages a proximal rod 56 and advances the same toward the uppermost end of structure 42. Thus, chains 52 are advanced through predetermined distances, depending upon the arcuate distance through which crossbar 174 moves. It is thus seen that if an article to be vended is disposed between a pair of adjacent rods 56 at the lowermost end of structure 42, the article will be moved off the upper surface 70 of panel 68 as chains 52 move under the influence of link 80. The article is thus moved over the lowermost end of structure 42 and is free to gravitate to collection means 36 therebelow. To change the arcuate distance through which crossbars 174 move, crank arm 186 is slotted at 190 to receive the upper end of arm 184 to thereby lengthen the effective moment arm of crank arm 186 and thereby increase the arcuate distance through which crossbar 174 moves.

Latch 96 remains in latched engagement with the corresponding crossbar 174 until bar 112 is released and returns to the equilibrium position thereof illustrated in FIG. 6. This occurs when solenoid 116 is de-energized and when member 124 is rotated in a clockwise sense when viewing FIG. 7 under the influence of a rod 56 engaging edge 134. This action causes extension 128 to move to a position permitting pin 130 to move beneath extension 128 and beneath strip 108. Depression 110 will be aligned with bar 112 when linkage 72 is in the uppermost position thereof. Thus, downward movement of linkage 72 will cause bar 112 to move out of depression 110 and along the proximal edge of strip 108, thereupon causing strip 108 and thereby linkage 72, to move upwardly. Upward movement of linkage 72 is sufficient to unlatch or move latch 96 away from the corresponding crossbar 174 and into the equilibrium position illustrated in FIG. 3. It is evident that member 124 will not rotate into the position illustrated in FIG. 7 until a rod 56 engages edge 134. Thus, the spacing between rods 56 may be chosen so as to accommodate articles of irregular sizes and shapes, notwithstanding the fact that pins 54 are equally spaced along chains 52.

Switch 142 is utilized for maintaining motor 176 in operation so long as member 124 is in a position with edge 134 substantially across the path of travel of rods 56, or when extension 128 is in a position preventing bar 112 from moving into the position illustrated in FIG. 6.

A microswitch 192 is operably coupled with disc 180 through a shiftable lever 194 engageable with a pin 196 on disc 180 adjacent the periphery thereof. Switch 192 is operably coupled with switch 142 in a manner such that when switch 142 is deactuated, switch 192 will maintain motor 176 energized until pin 196 moves to a location depressing lever 194 and deactuating switch 192. It is, therefore, evident that although member 124 will have moved into the position thereof illustrated in FIG. 7, motor 176 will remain energized to advance chains 52 until pin 196 depresses lever 194 to deactuate switch 192. Motor 176 will then become de-energized, but by this time, the lowermost article will have been moved off structure 42 and will have gravitated into collection means 36.

Spring 86 is utilized for biasing linkage 72 toward the lowermost end of structure 42 and further maintains latch 96 in latched engagement with crossbar 174 until bar 112 moves into depression 110 of strip 108. Spring 86 also serves to bias arm 88 in a counterclockwise sense when viewing FIG. 3 so that when pin 158 moves out of notch 160, rod 150 moves longitudinally of the structure 42 toward the uppermost end of the latter.

In stocking structure 42, rod 150 is manipulated so as to shift link 80 upwardly with respect to the corresponding stretch 66. Pin 158 moves into notch 160 to maintain link 80 in this position. The chains 52 are then shifted in a direction to move the upper cross rods 56 rearwardly until the operator has access to the initially forwardmost area between the rods 56, which is empty of a product to be vended. Articles may then be placed between adjacent pairs of rods 56 and one or the other of chains 52 may be manually moved to advance the articles along surface 70 until the lead article is at the lowermost end of structure 42. When all of the spaces between rods 56 adjacent stretches 64 of chains 52 are filled, structure 42 is ready for operation.

To prevent free wheeling of structure 42 when the same is being stocked, a spring clip 198, carried in any suitable manner by a bracket 200 on one of the sides 44 (FIG. 4), is utilized for engaging either a proximal rod 56 or chain 52 and preventing movement of chains 52 until sufficient force is applied thereto to cause chains 52 to move relative to clip 198.

A "sold-out" microswitch 202 is carried adjacent spring clip 198 beneath panel 68 as is clear in FIG. 4. A lever 204 is operably coupled with the shiftable pole of switch 202 and extends through a slot 206 in panel 68 within the path of travel of articles supported on surface 70. Switch 202 is actuated when the last article has been removed from structure 42 to prevent actuation of motor 176. A connector 207 is carried by bracket 92 and is operably coupled with solenoid 116, switch 142 and switch 202 for facilitating the coupling of these elements with coin-actuated mechanism forming a part of machine 26.

Collection means 36, as is shown in FIGS. 21–23, include an open top receptacle 208 having a front wall 210, a pair of side walls 212, a rear wall 214 and a bottom wall 216. Front wall 210 is mounted on machine 26 below panel 34 by means of a hinge 218 for movement about a horizontal axis from the position illustrated in FIG. 22 to the position illustrated in FIG. 23 to permit access to an article within receptacle 208 after the article has gravitated from the lowermost end of one of the structures 42 thereabove.

A guard 220 is carried by receptacle 208 for preventing access to the remaining articles within machine 26 when receptacle 208 is in the position illustrated in FIG. 23. Guard 220 includes a pair of side walls 222 and an arcuate top wall 224 interconnecting side walls 222, the latter being pivotally mounted by means of pins 226 on a pair of triangularly shaped plates 228 (FIG. 21) forming portions of machine 26 at the lowermost margin thereof. Lever means 230 couples guard 220 with receptacle 208 adjacent each side wall 212 of the latter, and includes a first arm 232 pivotally mounted adjacent one end thereof on the corresponding side wall 222 as is clear in FIGS. 22 and 23. The opposite end of arm 232 is pivotally secured to one end of an arm 234, the latter in turn being pivotally mounted intermediate the ends thereof on plate 228, as is clear in FIGS. 22 and 23.

The opposite end of each arm 234 is provided with a projection 238 thereon which is received within a substantially L-shaped slot 240 formed in the corresponding side wall 212 to serve as means for drawing guard 220 into the position of FIG. 23 as receptacle 208 is swung outwardly from machine 26. A coil spring 242 secured to a bracket 244 and to one of the side walls 222, biases receptacle 208 toward its closed position shown in FIG. 22.

As receptacle 208 is manually drawn outwardly from machine 26 as handle 246 is grasped, projections 238 remain within the shorter section of slot 240 until top wall 224 has moved into the position of FIG. 23. Further outward movement of receptacle 208 causes projections 238 to move downwardly toward the longer sections of slots 240 by virtue of the pivotal interconnections of arms 232 and 234, and the pivotal connections between side walls 222 and arms 232. Projections 238 then move along the longer sections of slots 240 toward the opposite extremities thereof, permitting access to an article within receptacle 208 through the open top of the latter.

Release of handle 246 is sufficient to cause receptacle 208 to move into the closed position thereof illustrated in FIG. 22, whereupon guard 220 once again assumes a position clearing the open top of receptacle 208 to thereby permit an article to gravitate thereinto.

Another type of article supporting and dispensing structure is illustrated in FIGS. 9–12 and is broadly denoted by the numeral 248. This type of structure is preferably utilized for supporting and dispensing articles of merchandise packaged in boxes or the like.

Structure 248 includes a pair of spaced, substantially parallel sides 250 normally inclined to the vertical in the manner shown in FIG. 10. A pair of article-supporting members 252 having an inverted V-shaped, transverse, cross-section, is integral with sides 250 as is shown in FIG. 12, each member 252 having a longitudinally extending article-engaging surface 254 formed by the apex end of the corresponding member 252. Surfaces 254 are substantially parallel and span the distance between the uppermost and lowermost ends of structure 248.

A roller 256 is journalled for rotation in sides 250 and disposed in a position for blocking the path of articles disposed on surfaces 254. As is clear in FIG. 11, roller 256 is disposed above the inclined plane of surfaces 254 so that the lowermost article supported by structure 248 abuts roller 256. A roller element 258 is shiftably mounted on sides 250 by a pair of lever arms 260 pivotally mounted on sides 250 and interconnected by a shaft 262 (FIG. 9). The ends of roller element 258 pass through aligned, arcuate slots 264 in sides 250 to facilitate the interconnection of roller element 258 with lever arms 260. Roller element 258 is normally below the inclined plane of surfaces 254 and is, therefore, below the lowermost article carried thereby. Upward swinging movement of roller element 258 is sufficient to elevate the lowermost article above roller 256 and to thereby permit the article to pass over roller 256 for gravitation from structure 248. The article next adjacent the lowermost article will then be permitted to gravitate to a position abutting roller 256 after roller element 258 has been retracted to the position thereof illustrated in FIG. 11.

An elongated linkage 266 is coupled with one of the lever arms 260 as is clear in FIG. 10, and passes through a slot 268 in a bracket 270 secured to the proximal side 250 adjacent the upper most end of the latter. Linkage 266 carries at the uppermost end thereof, a latch 272 identical in all respects to latch 96 of structure 42 for moving into latching engagement with a corresponding crossbar 174 of drive structure 74.

Linkage 266 is maintained out of latching engagement with a corresponding crossbar 174 by means of a bar 274 operably coupled to the armature 276 of an electrically actuated solenoid 278 carried by a U-shaped platform 280 on sides 250 in the manner shown in FIG. 12. A coil spring 282 biases bar 274 in a direction away from solenoid 278.

Bar 274 is disposed for engaging the underside of a plate 284 secured to and extending downwardly from linkage 266. When solenoid 278 is energized, bar 274 is retracted inwardly thereby, permitting plate 284, and thereby linkage 266, to swing downwardly about pin 286 which secures linkage 266 to the corresponding lever arm 260. When this occurs, latch 272 moves into latching engagement with the corresponding crossbar 174 and is thereby moved substantially longitudinally of structure 248 away from the lowermost end of the latter. This results in swinging roller element 258 upwardly to elevate the lowermost article thereabove.

Plate 284 is provided with an inclined edge 288 which engages bar 274 for elevating latch 272 out of latching engagement with the corresponding crossbar 174 as the latter returns to its initial position when motor 176 completes one cycle of operation. Roller element 258 is thus actuated only one time for each revolution of disc 180. A coil spring 290 coupled with linkage 266 and the proximal side 250, biases linkage 266 toward the lowermost end of structure 248 and thereby retains latch 272 in latched engagement with crossbar 174 until latch 272 moves out of such latching engagement under the influence of plate 284.

A "sold-out" microswitch 292 is carried in any suitable manner adjacent the lowermost end of structure 248 and is provided with a lever 294 biased in a direction for movement into the path of travel of articles carried by surfaces 254. A connector 296 is carried by bracket 270 and is operably coupled with solenoid 278 and switch 292 for facilitating the coupling thereof with the coin-actuated mechanism forming a part of machine 26.

Another structure for supporting and dispensing articles of merchandise is illustrated in FIGS. 13–16 and is broadly denoted by the numeral 298. This type of structure is adapted for supporting and dispensing articles in the nature of loaves of bread.

Structure 298 includes a pair of spaced, substantially parallel sides 300 normally inclined in machine 26 in the manner shown in FIG. 14. A bracket 302 is secured to each side 300 and extends outwardly therefrom at the normally lowermost end thereof as is clear in FIGS. 14 and 15. A receptacle broadly denoted by the numeral 304, is swingably mounted on brackets 302 for rotation about a substantially horizontal axis in spaced relationship to the lowermost ends of sides 300.

Receptacle 304 includes a shaft 306 and a pair of angularly disposed panels 308 and 310 rigid to shaft 306 for rotation therewith. Panel 308 is normally disposed in alignment with the article supporting surface 312 formed by a longitudinally extending panel 314 integral with sides 300 as is clear in FIG. 16.

Panel 310 is normally disposed in blocking relationship to articles carried on surface 312 to prevent the movement of such articles from structure 298. Rotation of shaft 306 in a clockwise sense when viewing FIG. 15, causes an article on panel 308 to rotate with receptacle 304 until panel 310 assumes the dashed line position of FIG. 15, whereupon the article is in condition for gravitation from receptacle 304 into collection means 36 disposed therebelow.

Means for rotating receptacle 304 includes a crank arm 316 rigid to one end of shaft 306. An arm 318 is pivotally secured to the outermost end of arm 316 and to one end of an elongated linkage 320 similar in all respects to linkages 72 and 266 of structures 42 and 248 respectively. A pin 322 is secured to the proximal side 300 and extends laterally therefrom and through a slot 324 in the normally lowermost end of linkage 320.

Linkage 320 also passes through a slot (not shown) in a bracket 326 secured to the proximal side 300 adjacent the uppermost end thereof. As linkage 320 moves longitudinally of structure 298 in a direction away from the lowermost end of the latter, arm 318 is moved therewith to thereby rotate shaft 306 in a clockwise sense when viewing FIG. 15. This in turn effects the rotation of panels 308 and 310 to the dashed line positions shown in FIG. 15.

Movement of linkage 320 in the opposite direction causes shaft 306 to rotate in a counterclockwise sense when viewing FIG. 15 to thereby move panels 308 and 310 back into the full-line positions thereof shown in FIG. 15.

A substantially L-shaped retainer 328 is operably coupled with linkage 320 for movement into the path of travel of the articles remaining on surface 312 as shaft 306 rotates to dispense an article carried on panel 308. Retainer 328 is pivotally mounted by means of a pin 330 on the proximal side 300 and is provided with an extension 332 having a slot 334 therein which receives the pin 336 which interconnects linkage 320 and arm 318. Longitudinal movement of linkage 320 away from the lowermost end of structure 298 causes retainer 328 to rotate in a counterclockwise sense when viewing FIG. 14 to cause retainer 328 to move into the dashed line position of FIG. 15 in blocking relationship to the articles remaining on surface 312.

Movement of linkage 320 in the opposite direction also swings retainer 328 in a clockwise sense when viewing FIG. 14 to thereby move the same out of blocking relationship to the path of travel of the articles on surface 312.

A latch 338 similar in all respects to latches 96 and 272 of structures 42 and 248 respectively, is adjustably secured to the uppermost end of linkage 320 for movement into and out of latched engagement with the corresponding crossbar 174 of drive structure 74.

A solenoid 340 is carried by a U-shaped platform 342 on sides 300 adjacent the uppermost ends of the latter. Solenoid 340 is provided with an armature 344 which in turn is coupled with a bar 346 disposed for engaging the underside of a plate 348 secured to and extending downwardly from linkage 320 as is clear in FIG. 14. A coil spring 350 biases bar 346 in a direction away from solenoid 340.

When solenoid 340 is energized, bar 346 is drawn inwardly with respect thereto to permit latch 338 to move downwardly and into latching engagement with the corresponding crossbar 174. Linkage 320 is then moved longitudinally of structure 298 in a direction away from the lowermost end thereof to thereby effect the rotation of shaft 306 and the swinging movement of retainer 328.

Plate 348 is provided with an inclined edge 352 which engages bar 346 after the latter has moved back into its equilibrium position under the influence of spring 350 following the de-energization of solenoid 240. Linkage 320 is thus moved upwardly and out of latching engagement with the corresponding crossbar 174 so that only a single article is dispensed from structure 298 for each revolution of disc 180. A coil spring 354 operably coupled with linkage 320 and the proximal side 300, biases linkage 320 in a direction toward the lowermost end of structure 298 and thus serves to maintain latch 338 in latched engagement with the corresponding crossbar 174 until linkage 320 is moved upwardly with respect to the crossbar 174 under the influence of plate 348.

A "sold-out" switch 356 is carried in any suitable manner on structure 298 and is provided with a shiftable pole rigid to a lever 358 biased in a direction toward the path of travel of articles on surface 312. As is clear in FIG. 15, switch 356 is below surface 312 and lever 358 is in the position thereof indicating a "sold-out" condition for structure 298. A connector 360 is carried by bracket 326 (FIG. 14) and is operably coupled with solenoid 340 and switch 356 for facilitating the coupling of these elements with coin-actuated mechanism forming a part of machine 26.

Although a number of structures 42 has been utilized in describing the interconnection of latches 96 with crossbars 174 in FIG. 20, it is clear that structures 248 or 298 may be utilized in their stead. Moreover, individual structures 42, 248 and 298 may be disposed in side-by-side relationship, or in vertically spaced relationship, depending upon the type of article to be vended or the manner in which the same is packaged. It is, therefore, evident that structures 42, 248 and 298 are mutually interchangeable, depending upon the demands for the articles supported and dispensed thereby.

As is clear in FIG. 17, a number of vertically spaced structures 248 are carried within machine 26 to illustrate a single tier of article supporting and dispensing means. It is noted that a pair of crossbeams 362 and 364 is provided for supporting each structure 248, there being spaced, hook-shaped brackets 366 secured in any suitable manner to the underside of the corresponding structure 248 for intercoupling with corresponding crossbeams 362 and 364. Brackets 366 are also coupled with structures 42 and 298 so that structures 42, 248 and 298 may be readily installed or removed from operative positions within machine 26.

It is noted that the lowermost ends of structures 248 are maintained in spaced relationship to panel 34 to provide a passageway for articles dispensed from the lowermost ends of structures 248. Similarly, the lowermost ends of structures 42 and 298 are also maintained in spaced relationship to panel 34 for the same reason. The open top of receptacle 208 is disposed below and in alignment with the passageway formed by panel 34 and the lowermost ends of the article supporting and dispensing structures disposed thereabove.

As shown in FIG. 1, a number of different types of articles are disposed within machine 26 on structures 42, 248 and 298. For instance, a series of three structures 42 is utilized for supporting three different types of articles 368, 370 and 372 respectively, on the first or upper row behind panel 34. Such structures are aligned with corresponding push buttons 40 on crosspieces 38 adjacent thereto.

In the second row of articles, a structure 298 is utilized in conjunction with a structure 248 and a structure 42 adjacent thereto for again supporting three different types of articles. Similarly, in the third, fourth and fifth rows within machine 26, like structure 42, 248 and 298 are utilized for supporting still different articles of merchandise, the latter two rows being utilized for supporting and dispensing articles in the nature of loaves of bread.

Coin responsive mechanism broadly denoted by the numeral 374, is schematically illustrated in FIG. 24 and includes a price-setting terminal board 376 and a contact-carrying member 378 having a series of spaced contacts 380 operably coupled with corresponding terminals on board 376. Mechanism 374 is preferably of the well-known totalizer type which furnishes a pulse for advancing a shiftable pole 382 of member 378 for each 5¢ increment of coin deposit in one of any of the three coin switches 384, 386 or 388. In this respect, pulse motor 390 is actuated when a 25¢ piece is placed in the coin slot of machine 26 to actuate switch 384. To energize motor 390, current flows from a terminal 392 through a lead 394, switch 384, lead 396, pulse motor 390, lead 398 and lead 400 to a terminal 402, it being clear that terminals 392 and 402 are operably coupled with a source of electrical power such as an A.C. supply. Actuation of motor 390 causes pulse switch 404 to be actuated to energize the coil 406 of the "add" solenoid operably coupled with member 378 for "stepping" pole 382 along the contacts 380. Current is supplied to coil 406 through the circuit containing terminal 392, lead 394, switch 384, lead 396, switch 404, lead 408, coil 406, lead 410, lead 400, and terminal 402.

When a 10¢ piece is placed in the coin slot, switches 386 and 388 are successively actuated to step pole 382 through the distance corresponding to a pair of contacts 380 through a first circuit containing terminal 392, lead 394, switch 384, lead 412, switch 386, lead 414, switch 404, lead 408, coil 406, lead 410, lead 400 and terminal 402. The add solenoid 406 is then again actuated upon changing of the contacts of switch 388 by the 10¢ piece.

Similarly, the deposit of a 5¢ piece in the coin slot of machine 26 actuates switch 388 to step pole 382 through a distance corresponding to a single interval between a pair of contacts 380 by means of the energization of coil 406 through the circuit containing terminal 392, lead 394, switch 384, lead 412, switch 386, lead 416, switch 388, lead 418, lead 414, switch 404, lead 408, coil 406, leads 410 and 400 and terminal 402.

It is to be noted that all of the switches illustrated in FIG. 24 are in their normal unactuated conditions. Actuation of each switch is, therefore, sufficient to move the shiftable pole thereof to the opposite contact.

A number of connectors shown schematically in FIG. 24 and denoted by the numeral 420, are operably coupled with mechanism 374 and are adapted to be releasably and interchangeably coupled with connector 207, 296 and 360 of structures 42, 248 and 298 respectively.

FIG. 24 illustrates schematically the interconnection with the connectors 420 of the solenoids and "sold-out" switches corresponding to structures 42, 248 and 298. The units 422 each containing a solenoid and a microswitch and illustrated by dashed lines in FIG. 24, may represent the electrical portions of structures 248 and 298, with the solenoid representing either solenoid 278 or solenoid 340 and the switch representing switch 292 or 356. The single unit 424 shown in dashed lines and containing a pair of microswitches, together with a solenoid, represents the electrical portions of structure 42. For intsance, one of the units 422 representing a single structure 248, is provided with solenoid 278 and "sold-out" switch 292. A lead 426 couples one end of solenoid 278 to the corresponding connector 296, a lead 428 connects the opposite end of solenoid 278 with switch 292, and a lead 430 connects switch 292 with connector 296. Connector 420 may then be operably coupled with connector 296 for placing unit 422 in electrically coupled relationship with mechanism 374. Motor 176 may then be actuated by depressing any one of the push buttons 40 on the front of machine 26 to actuate the corresponding selection switch coupled therewith. The collection switches corresponding to push buttons 40 are enumerated 434, there being a switch 434 for each of the units 422 and for unit 424 of FIG. 24.

Assuming the proper coinage has been deposited in the coin slot of machine 26 to step pole 382 to the proper contact 380, and further assuming that the switch 434 corresponding to structure 248 represented by one of the units 422 is actuated by depressing the corresponding push button 40, motor 176 is energized by energizing a vend relay 436, the latter forming a part of mechanism 378 and having switches 438, 440 and 442 coupled therewith.

Assuming a 25¢ purchase is to be made, the purchaser deposits the coin in the coin slot of machine 26 and switch 384 is actuated to step pole 382 to the contact corresponding to the 25¢ deposit. Relay 436 is energized through the circuit comprising terminal 392, lead 394, lead 444, switch 440, lead 446, switch 434, lead 448, lead 430, switch 292, lead 428, solenoid 278, lead 426, lead 450, the corresponding terminal of board 376, the corresponding contact 380, pole 382, lead 452, switch 454, lead 456, switch 458, lead 460, switch 442, lead 462, relay 436, lead 400 and terminal 402.

When relay 436 is energized, switch 440 is actuated to energize motor 176 through the circuit comprising terminal 392, lead 394, lead 444, switch 440, lead 464, lead 466, motor 176, lead 468, lead 400 and terminal 402.

A relay 470 operably coupled with switch 458 is connected in parallel with motor 176 and is thereby energized therewith to actuate switch 458 and thus open the circuit containing leads 456 and 460. However, switch 192, coupled with motor 176, does not immediately become actuated upon the energization of motor 176 so that switch 442, which is a make-before-break switch, maintains relay 436 energized for a finite time interval until switch 192 is actuated. This is accomplished through the circuit comprising terminal 392, lead 394, lead 472, switch 192, lead 474, switch 442, lead 462, relay 436, lead 400 and terminal 402. As switch 192 is actuated upon the rotation of disc 180, the last mentioned circuit is opened to de-energize relay 436 since lead 472 is uncoupled from lead 474.

Switch 458 is provided in the circuit containing leads 456 and 460 in order to prevent the initiation of another vend cycle before completion of a vend cycle in progress.

When relay 436 is de-energized, switches 438, 440 and 442 return to their normal positions so that the circuit to motor 176 and including leads 464 and 466, is opened. However, switch 192 will have by that time been actuated so that motor 176 is maintained in operation through the circuit comprising terminal 392, lead 394, lead 472, switch 192, lead 476, lead 468, lead 400 and terminal 402. Motor 176 will remain energized until disc 180 rotates to a position depressing lever 194 to thereby dispose switch 192 in the normal condition thereof.

Actuation of motor 176 for a period of time sufficient to permit a single revolution of disc 180, causes the lowermost article on the corresponding structure 248 to move to a position for gravitation into collection means 36.

As relay 436 is energized, switch 438 is actuated to actuate coin-acceptance solenoid 478 through the circuit comprising terminal 392, lead 394, lead 444, switch 438, lead 480, solenoid 478, lead 482, lead 400 and terminal 402. In addition, the re-set coil 484 of member 378, is energized to reset pole 382 to its initial position through the circuit comprising terminal 392, lead 394, lead 444, switch 438, lead 480, lead 486, switch 488, lead 490, coil 484, lead 410, lead 400 and terminal 402.

Mechanism 378 is provided with a coin-return electromagnet 492 which is normally in operation and is interrupted only when one of the swtiches 434 is actuated. Electromagnet 492 is energized through the circuit comprising terminal 392, lead 394, lead 444, switch 440, lead 446, switch 434, lead 494, switch 434, lead 496, switch 434, lead 498, switch 434, lead 500, switch 434, lead 502, lead 504, electromagnet 492, lead 400 and terminal 402.

A coin-return solenoid 405 is operably coupled with a coin return switch 508 associated with mechanism 378 for returning the coins of the purchaser prior to the actuation of one of the switches 434. Solenoid 506 is energized through the circuit comprising terminal 392, lead 394, lead 444, switch 440, lead 446, switch 434, lead 494, switch 434, lead 496, switch 434, lead 498, switch 434, lead 500, switch 434, lead 502, lead 510, switch 508, lead 512, solenoid 506, lead 400 and terminal 402.

Although the operation of only one of the units 422 has been described, it is clear that the remaining units 422 are energized in the same manner since switches 434 are interconnected by leads 494, 496 and 498. Also, unit 424 is actuated in the same manner as each of the units 422 with but one exception. Unit 422, representing structure 42, includes solenoid 116 and switch 202 in series, the latter elements being coupled with connector 207 for interconnection with the corresponding connector 420. The lead 514 is releasably coupled with a terminal on price-setting board 376, depending upon the price of the article to be vended from the structure 42.

In addition, unit 424 includes switch 142 which is coupled with member 124 and with terminals 392 and 402 to maintain motor 176 energized even though switch 192 has been deactuated until a rod 56 engages edge 134 of member 124 to shift the latter upwardly to thereby deactuate switch 142.

Assuming unit 424 is placed in operation in the usual manner by actuating the corresponding switch 434, motor 176 is maintained in operation regardless of the condition of switch 192 through the circuit comprising terminal 392, lead 394, lead 472, line 516, lead 518, switch 142, lead 502, lead 464, lead 466, lead 476, motor 176, lead 468, lead 400 and terminal 402. Switch 142 is actuated only when member 124 is in a downwardly extending position with respect to panel 68. This occurs when pin 130 has moved outwardly from beneath extension 128 upon the energization of solenoid 116.

Switch 142 is deactuated when a rod 56 shifts member 124 upwardly to permit pin 130 to pass beneath extension 128.

Switch 454 is utilized in the circuit of relay 436 to assure that there will be no making or breaking of the circuit to relay 436 as pole 382 moves over contacts 380. Furthermore, switch 454 serves as a safety device for preventing jackpotting of machine 26 should any one of the switches 434 remain in their actuated positions after pressure has been released from the corresponding push buttons 40.

It is evident that structures 248 and 298 remain in operation for a time equivalent to the time required for disc 180 to make a complete revolution since switch 192 is deactuated at the completion of the revolution. However, rods 56 of structure 42 will continue to move under the influence of chains 52 so long as member 124 is in the downward position thereof with respect to panel 68. This, of course, is due to the use of switch 142 coupled with motor 176 to maintain the latter energized until a rod engages member 124 to force the latter upwardly. Hence, structure 42 is capable of accommodating articles of merchandise to be vended which may be of irregular sizes and shapes since rods 56 are removable from pins 54.

The operation of machine 26 is apparent from the foregoing, but the same will be briefly described as follows:

The articles carried by machine 26 are displayed in the manner shown in FIG. 1 and associated price tags may be placed adjacent push buttons 40 or aligned in any suitable manner with the structures 42, 248 and 298 corresponding to push buttons 40. A purchaser, noting the price of a desired article, deposits coins amounting to the price established in switches 384, 386 or 388 to step pole 382 to the proper contact 380. The switch 434 corresponding to the structure supporting the desired article is actuated by depressing the corresponding push button 40, which in turn energizes relay 436 to energize motor 176.

If the desired article is carried on a structure 248, roller element 258 will shift upwardly under the influence of motor 176 to elevate the lowermost article to a position clearing roller 256, whereupon the article will move off structure 248 and gravitate into collection means 36.

If the desired article is carried by structure 298, shaft 306 will rotate upon energization of motor 176 to move the article carried thereby, into a position for gravitation into collection means 36. If the desired article is carried by structure 42, actuation of the corresponding switch 434 will energize motor 176 to advance chains 52 through a predetermined distance, depending upon the spacing of rods 56.

If the article to be vended from structure 42 is of small size, rods 56 will be relatively close together, whereupon chains 52 will move only a short distance in order to move the article into a position for gravitation from structure 42. If the article carried by structure 42 is large or bulky, rods 56 will be spaced relatively long distance apart and chains 52 will move a correspondingly greater distance in order to advance the article to a position for gravitation from structure 42. It is clear that the size of the article to be vended from structure 42 determines the spacing between rods 56.

Having thus described the invention what is claimed as new and desired to be secured by Letters Patent is:

1. A vending machine comprising:
   a plurality of inclined, elongated support structures each disposed for supporting a number of articles in a line thereon;

dispensing means at the lowermost end of each support structure for releasing the lowermost article from a support structure each time the respective dispensing means is actuated and as the remaining articles on the support structure move toward the lowermost end thereof;

elongated actuating means mounted on each of the support structures for reciprocation longitudinally thereof and operably coupled to a respective dispensing means for actuating the latter to dispense said lowermost article from one of the support structures as the actuating means mounted thereon is reciprocated;

shiftable drive means remote from said dispensing means and disposed to be selectively engaged by any one of said actuating means for reciprocating the latter in response to shifting of said drive means;

power means for shifting said drive means; and control means including coin responsive mechanism for effecting selective coupling of one of the actuating means to said drive means and for actuating said power means only after deposit of proper coinage in said mechanism.

2. A vending machine comprising:

a housing;

a plurality of inclined, elongated support structures within said housing, each support structure being disposed to support a number of articles in a line thereon;

dispensing means at the lowermost end of each support structure for releasing the lowermost article from a support structure each time the respective dispensing means is actuated and as the remaining articles on the support structure move toward the lowermost end thereof;

elongated actuating means mounted on each of the support structures for reciprocation longitudinally thereof and operably coupled to a respective dispensing means for actuating the latter to dispense said lowermost article from one of the support structures as the actuating means mounted thereon is reciprocated;

shiftable drive means remote from said dispensing means and disposed to be selectively engaged by any one of said actuating means for reciprocating the latter in response to shifting of said drive means;

power means for shifting said drive means;

control means including coin responsive mechanism for effecting selective coupling of one of the actuating means to said drive means and for actuating said power means only after deposit of proper coinage in said mechanism; and accessible collection means on said housing in a position to receive articles dispensed from said support structures, said collection means including means preventing access to the articles remaining on said support structures while the customer has access to said collection means for removal of articles therefrom.

3. A vending machine comprising:

a plurality of inclined, elongated support structures each disposed for supporting a number of articles in a line thereon;

dispensing means at the lowermost end of each support structure for releasing the lowermost article from a support structure each time the respective dispensing means is actuated and as the remaining articles on the support structure move toward the lowermost end thereof;

elongated actuating means mounted on each of the support structures for reciprocation longitudinally thereof, each operably coupled at one end of the same to a respective dispensing means for actuating the latter as the actuating means shifts in one direction of movement thereof and provided with a hook on the opposite extremity; thereof means coupled to each of the actuating means for biasing the latter in a direction opposite to said one direction of movement of the same;

oscillating drive means remote from said dispensing means and disposed to be selectively engaged by the hook end of any one of said actuating means for reciprocating the latter in said one direction against the bias thereon to effect actuation of a respective dispensing means, said biasing means being operable to return the actuating means to the initial position thereof after release of said lowermost article from a selected support structure;

power means for oscillating said drive means; and control means including coin responsive mechanism for effecting selective coupling of the hook end of one of the actuating means to said drive means and for actuating said power means only after deposit of proper coinage in said mechanism.

4. A vending machine as set forth in claim 3 wherein each dispensing means includes means on the respective support structure receiving one article therebetween for advancing the remaining articles on the support structure toward the lowermost end thereof as the lowermost article is dispensed by actuation of the dispensing means.

5. A vending machine as set forth in claim 3 wherein said actuating means are swingable into coupling engagement with said drive means, and are then movable in a second direction with the shiftable means to thereby actuate the respective dispensing means operably coupled therto.

6. A vending machine as set forth in claim 3 wherein said drive means comprises a device having a series of crossbars thereon and means for mounting said device for motion in a direction to move an elongated actuating means coupled to a corresponding crossbar along a generally rectilinear path of travel longitudinally of a corresponding support structure.

7. A vending machine as set forth in claim 6 wherein said power means includes a prime mover and crank structure operably coupling said prime mover to said device for shifting the same in said direction of movement thereof.

8. A vending machine as set forth in claim 6 wherein said coin responsive mechanism includes solenoid means on each of the support structures engageable with the actuating means thereon for maintaining the latter out of engagement with an adjacent crossbar of said device until after actuation of the respective solenoid means.

9. A vending machine comprising:

a plurality of inclined, elongated support structures each adapted for receiving a number of articles to be vended;

dispensing means at the lowermost end of each support structure for releasing one article from a support structure each time the respective dispensing means is actuated, the dispensing means at the lowermost end of a first support structure including shiftable flexible means extending longitudinally of the first support structure and provided with a plurality of members extending transversely of the first support structure and spaced longitudinally of the latter a distance to receive one article therebetween whereby upon shifting movement of the flexible means toward the lowermost end of the first support structure through an increment equal to the length of the article, the latter is dispensed from the lowermost end of the support structure, the dispensing means at the lowermost end of a second support structure including article blocking means extending transversely of said second support structure and article shifting means for moving the article at the lowermost end of said second support structure to a position clearing said blocking means to permit the article to gravitate from said lowermost end of the second support structure, the dispensing means of a third support structure including a swingable receptacle normally disposed for receiving the article at the lowermost end of said third support structure and swingable in a direction to permit said lowermost article to gravitate from the third support structure;

elongated actuating means reciprocably mounted on each of the support structures for shifting movement longitudinally thereof and operably coupled to respective dispensing means for actuating the latter to dispense an article from one of the support structures as the actuating means coupled thereto is reciprocated;

shiftable drive means adjacent the uppermost extremities of said support structures remote from said dispensing means and disposed to be selectively engaged by any one of said actuating means for reciprocating the latter in response to shifting of said drive means;

power means for shifting said drive means; and control means including coin responsive mechanism for effecting selective coupling of one of the actuating means to said drive means and for actuating said power means only after deposit of proper coinage in said mechanism.

10. A vending machine as set forth in claim 9 wherein is included a housing receiving said support structures and having an upright wall and article collecting means disposed adjacent the lower extremity of said wall for receiving articles from said one end of each of the support structures and rendering the articles accessible for subsequent removal from said housing, said first, second and third structures being disposed within said housing with said ends thereof directly above said collecting means and spaced from said wall a distance sufficient to permit articles to pass along said wall toward and into said collecting means after the articles move off said ends.

11. A vending machine comprising:
a plurality of inclined, elongated support structures each disposed for supporting a number of articles to be vended;

blocking means extending transversely of the lowermost end of each support structure for preventing gravitation of the lowermost article from each support structure;

article shifting means adjacent each of said blocking means on the support structures for lifting the lowermost article on each support structure to a position clearing said blocking means to thereby permit the lowermost article to gravitate from a respective support structure;

elongated actuating means reciprocably mounted on each of the support structures for shifting movement longitudinally thereof and operably coupled to a respective article shifting means for actuating the latter to dispense an article from one of the support structures as the article shifting means is moved during shifting of the actuating means coupled thereto;

shiftable drive means adjacent the uppermost extremities of said support structures and disposed to be selectively engaged by any one of said actuating means for reciprocating the latter in response to shifting of said drive means;

power means for shifting said drive means; and control means including coin responsive mechanism for effecting selective coupling of one of the actuating means to said drive means and for actuating said power means only after deposit of proper coinage in said mechanism.

12. A vending machine as set forth in claim 11 wherein at least one of said support structures includes a pair of spaced, longitudinally extending, relatively narrow, article supporting surfaces, said blocking means being disposed at least partially above said surfaces.

13. A vending machine as set forth in claim 12 wherein said article shifting means on each of the supporting structures is normally disposed below said surfaces of the support structure and movable to a position above an adjacent blocking means.

14. A vending machine as set forth in claim 12 wherein said blocking means includes a roller journaled on the lowermost end of each support structure, the article shifting means each including an arm swingably mounted at one extremity thereof on the corresponding support structure and disposed below said roller and the path of movement of articles on a respective support structure, each of said arms being swingable upwardly to lift the article aligned therewith above said roller.

15. A vending machine as set forth in claim 14 wherein said one support structure includes a pair of spaced, opposed sides, said roller having a pair of opposed ends journaled in said sides respectively, there being an elongated article engaging roller element secured to the opposite extremity of said arm and extending substantially between said sides below the lowermost article.

16. A vending machine as set forth in claim 15 wherein one of the sides of said one support structure is provided with an arcuate slot therein, said arm being disposed exteriorly of said one side, said roller element having an end extending through said slot and coupled with the opposite extremity of said arm.

17. A vending machine as set forth in claim 11 wherein each of said actuating means includes link means coupled adjacent one end thereof with a respective article shifting means and having hook means adjacent the opposite end thereof for releasably latching with said shiftable drive means.

18. A vending machine as set forth in claim 17 wherein said control means includes solenoid actuated means for each of the actuating means, normally maintaining said link means in spaced relationship to said shiftable drive means and operable to permit the hook means of one of said link means to be coupled with said shiftable drive means only after proper coinage has been deposited in said mechanism.

19. A vending machine as set forth in claim 18 wherein each of said solenoid actuated means includes a retractable member engaging a respective link means for maintaining the hook means thereon out of engagement with said shiftable means, each of said hook means of respective link means being movable into latching engagement with said drive means upon operation of a corresponding solenoid actuated means.

20. A vending machine as set forth in claim 19 wherein is provided means for biasing each of said link means toward the initial position thereof and including a plate secured to each of said link means and provided with a retractable member engaging edge disposed for moving a respective link means away from said drive structure as the link means returns to its initial position.

21. A vending machine comprising:
a plurality of inclined, elongated support structures each disposed for supporting a number of articles to be vended;

dispensing means at the lowermost end of each support structure for releasing one article from a support structure each time the respective dispensing means is actuated, each dispensing means including a receptacle positioned within the path of travel of articles along each support structure and rotatable from a position supporting the lowermost article on each support structure to a location permitting said lowermost article to gravitate therefrom;

elongated actuating means reciprocably mounted on each of the support structures for shifting movement longitudinally thereof and operably coupled to a respective dispensing means for actuating the latter to dispense an article from one of the support structures as the actuating means mounted thereon is reciprocated;

shiftable drive means remote from said dispensing means and disposed to be selectively engaged by any one of said actuating means for reciprocating the latter in response to shifting of said drive means;

power means for shifting said drive means; and control means including coin responsive mechanism for effecting selective coupling of one of the actuating means to said drive means and for actuating said power means only after deposit of proper coinage in said mechanism.

22. A vending machine as set forth in claim 21 wherein said receptacle of each dispensing means includes a first panel normally aligned with said path of movement of the articles aligned therewith and disposed for supporting the corresponding lowermost article, and a second panel associated with said first panel in a position to prevent the movement of said lowermost article until the respective receptacle moves into said location thereof.

23. A vending machine as set forth in claim 22 wherein is included shaft means secured to said panels and operably coupled with the corresponding support structure for swingably mounting said receptacle on said structure, the respective actuating means operably associated therewith being operably coupled with said shaft means.

24. A vending machine as set forth in claim 23 wherein each of said dispensing means includes means for blocking movement of articles on the respective support structure toward said lowermost end thereof as the respective receptacle moves toward said location of the same to thereby prevent the remaining articles moving toward the lowermost end of a corresponding support structure until the respective receptacle has returned to the initial disposition of the same.

25. A vending machine as set forth in claim 24 wherein each of said blocking means includes an L-shaped retainer normally disposed below said path of movement of the articles on a respective support structure and movable across a respective path in response to the actuation of a corresponding dispensing means by said drive means.

26. A vending machine as set forth in claim 25 wherein is included a slotted arm secured to each of said retainers and pivotally mounted on a corresponding support structure, said actuating means each including pin means receivable within a respective slot of said arms for shifting the latter and thereby the retainer connected thereto as each of said actuating means is moved by said drive means.

27. A vending machine as set forth in claim 21 wherein said actuating means includes hook means thereon selectively engageable with said drive means as the hook means is shifted from a normal position away from said drive means to a location within the path of travel of said drive means.

28. A vending machine as set forth in claim 27 wherein is included means positioned to be engaged by said hook means on each of the actuating means for moving the respective hook means out of coupled relationship with said drive means as the corresponding actuating means is returned to the initial position thereof, and means on each of the support structures and coupled to said actuating means for normally biasing the latter into said initial position of the same.

29. A vending machine composing:

means for supporting a plurality of articles to be vended, said means including a number of elongated structures each adapted for disposing said articles in spaced relationship thereon;

article advancement means on each of said structures for normally preventing movement of said articles relative thereto, said advancement means being movable through a predetermined distance in a direction toward one end of the corresponding support structure to permit only the article at said one end of the support structure to move off the latter and to move the remaining articles thereon toward said one end until the article next adjacent to said first mentioned article is disposed at said one end, each of the advancement means including elongated, flexible means mounted on the corresponding support structure for movement along the length thereof and a number of article engaging elements coupled with said flexible means in disposition across each support structure and located in sufficient relative spaced relationship to receive an article therebetween;

actuatable drive means f orsaid advancement means;

means carried by each support structure normally spaced from said drive means and movable relative thereto into coupled relationship therewith for interconnecting said drive means and a corresponding flexible means to thereby effect movement of the latter through said distance upon actuation of said drive means; and control means including coin responsive mechanism operably coupled with each interconnecting means for selectively moving the interconnecting means of one of said structures into coupled relationship with said drive means and for effecting actuation of the latter only after the deposit of proper coinage in said mechanism.

30. A vending machine as set forth in claim 29 wherein said flexible means each includes a pair of spaced, endless members extending longitudinally of a corresponding support structure, said elements being secured to and spanning the distance between respective members.

31. A vending machine as set forth in claim 30 wherein said elements are releasably secured to said members.

32. A vending machine as set forth in claim 30 wherein each support structure includes a longitudinally extending, article supporting surface, each of said endless members having a longitudinally extending stretch spaced above a corresponding surface to cause said elements to be located in dispositions to engage articles on said surface of each of the support structures.

33. A vending machine as set forth in claim 29 wherein each of said article engaging elements includes a rod extending transversely of a respective support structure, and means on each of said flexible means for releasably coupling respective rods thereto.

34. A vending machine as set forth in claim 33 wherein said flexible means each includes a pair of spaced, longitudinally extending, endless members, said rods substantially spanning the distance between said members and said coupling means including spaced pins extending laterally from each member toward the adjacent member of a respective flexible means.

35. A vending machine as set forth in claim 34 wherein said pins on said members are transversely aligned, each of said rods having means thereon at the ends thereof for receiving an aligned pair of pins.

36. A vending machine as set forth in claim 35 wherein each rod is provided with a pin receiving bore at one end thereof and a pin receiving groove at the opposite end thereof, and means at the opposite end of each rod for releasably retaining a pin within the groove thereof.

37. A vending machine as set forth in claim 36 wherein said pin retaining means each includes a member engaging, coil spring secured to a respective rod and normally surrounding the groove therein, said spring being collapsible to an extent to expose said groove therein and permit a pin to be received in said groove in the same.

38. A vending machine as set forth in claim 29 wherein said interconnecting means each includes linkage means movable longitudinally of a corresponding support structure and engageable with one of said elements for moving the latter and thereby said flexible means through said distance.

39. A vending machine as set forth in claim 38 wherein each of said linkage means includes a link movable away from said one end of a corresponding support structure when said drive means is actuated and having shoulder means for engaging an adjacent element to direct the same away from said one end.

40. A vending machine as set forth in claim 39 wherein is included bias means operably coupled to each of the links for returning the latter to the initial positions thereof after a corresponding flexible means has moved through said distance.

41. A vending machine as set forth in claim 40 wherein each of said links is provided with an edge thereon adjacent said shoulder means thereon and disposed for permitting said link to pass over an adjacent element until a respective shoulder means is between said one end and said adjacent element.

42. A vending machine as set forth in claim 39 wherein is included means carried by each of the support structures and engageable with the link thereon for shifting the latter in a direction to dispose the shoulder means on the same out of the path of travel of said elements whereby articles may be placed on said structure between said elements as said flexible means is manually moved.

43. A vending machine as set forth in claim 42 wherein is included spring clip means on each of the support structures disposed within the path of travel of said elements thereon for preventing movement of a respective flexible means until the latter is manually moved and as said shoulder means of the corresponding link is disposed out of said path.

44. A vending machine as set forth in claim 29 wherein each of said interconnecting means includes coupling means movable into latching engagement with said drive means, said control means including solenoid actuated means for each of said support structures and normally disposed in a first position between said drive means and a respective interconnecting means for maintaining a corresponding coupling means out of engagement with said drive means, each of said solenoid actuated means being movable from said first position to a second position permitting the movement of the coupling means operably associated therewith toward said drive means and into latching engagement therewith.

45. A vending machine as set forth in claim 44 wherein each of said solenoid actuated means is operable to move a respective coupling means out of latching engagement with said drive means after a corresponding solenoid actuated means has returned to said first position from said second position.

46. A vending machine as set forth in claim 45 wherein is provided means for preventing the return of each of said solenoid actuated means to the first position thereof until after the flexible means operably associated therewith has moved through a preselected distance.

47. A vending machine as set forth in claim 46 wherein said return preventing means each includes a member shiftably mounted on a corresponding support structure and movable from a first location to a second location into the path of travel of a respective solenoid actuated means between said first and second positions thereof when said solenoid actuated means moves to said second position.

48. A vending machine as set forth in claim 47 wherein each of said members is provided with an element engaging edge disposed in the path of travel of corresponding elements when said member is in said second location, said member being engaged at said edge by an element and movable to said first location to permit the corresponding solenoid actuated means to return to said first position thereof.

49. A vending machine as set forth in claim 47 wherein said control means includes electrical switching means operably associated with said member and said drive means for maintaining the latter actuated during the time said member is in said second location of the same.

50. A vending machine comprising:
a plurality of elongated support structures each disposed to receive a number of articles in a line thereon;
article advancement means shiftably mounted on each of the support structures and provided with a plurality of cross members extending transversely of respective support structures, said cross members being spaced longitudinally of the support structures a distance to receive an article therebetween and disposed to successively discharge articles from the support structures as the cross members of said article advancement means are shifted toward the lowermost ends of the support structures;
actuating means on each of the support structures and operably coupled to the article advancement means thereon for shifting the cross members toward said lowermost ends of the support structures;
shiftable drive means remote from said dispensing means and disposed to be selectively engaged by any one of said actuating means for reciprocating the latter in response to shifting of said drive means;
power means for shifting said drive means; and
control means including coin responsive mechanism for effecting selective coupling of one of the actuating means to said drive means and for actuating said power means only after deposit of proper coinage in said mechanism, said control means including means on each support structure disposed to be engaged by said cross members and actuated thereby for controlling the period of actuation of said power means dependent upon the spacing between said cross members on a respective support structure whereby articles of different sizes may be provided on different support structures and may be varied on each of the support structures by alteration of the spacing of the cross members on the respective article advancement means.

References Cited in the file of this patent
UNITED STATES PATENTS

| | | |
|---|---|---|
| 2,638,396 | Gabrielsen | May 12, 1953 |
| 2,693,299 | Gross | Nov. 2, 1954 |
| 2,735,578 | Woodruff | Feb. 21, 1956 |
| 2,847,146 | Obourn | Aug. 12, 1958 |
| 2,875,877 | Hoban | Mar. 3, 1959 |
| 3,001,669 | Tandler et al. | Sept. 26, 1961 |